(12) United States Patent
Rosan

(10) Patent No.: US 9,051,739 B2
(45) Date of Patent: Jun. 9, 2015

(54) MODULAR FLOORING SYSTEM

(75) Inventor: Arnon Rosan, New York, NY (US)

(73) Assignee: Signature Systems Group, LLC, New York, NY (US)

( * ) Notice: Subject to any disclaimer, the term of this patent is extended or adjusted under 35 U.S.C. 154(b) by 893 days.

(21) Appl. No.: 12/761,396

(22) Filed: Apr. 16, 2010

(65) Prior Publication Data

US 2011/0252730 A1    Oct. 20, 2011

(51) Int. Cl.
| | | |
|---|---|---|
| *E04B 1/70* | (2006.01) |
| *E04F 17/00* | (2006.01) |
| *E04H 7/22* | (2006.01) |
| *E04F 15/02* | (2006.01) |
| *E01C 9/08* | (2006.01) |
| *E01C 11/22* | (2006.01) |
| *E04F 15/10* | (2006.01) |

(52) U.S. Cl.
CPC .......... *E04F 15/02183* (2013.01); *E01C 9/086* (2013.01); *E01C 11/225* (2013.01); *E01C 2201/12* (2013.01); *E04F 15/02038* (2013.01); *E04F 15/105* (2013.01); *E04F 2201/0146* (2013.01); *E04F 2201/091* (2013.01); *E04F 2201/096* (2013.01)

(58) Field of Classification Search
CPC ................ E04F 15/02183; E04F 15/02038; E04F 15/105; E04F 2201/0146; E04F 2201/091; E04F 2201/096; E01C 9/086; E01C 11/225; E01C 2201/12
USPC ................. 52/177, 180, 302.1, 302.4, 302.2, 52/591.1, 592.1
See application file for complete search history.

(56) References Cited

U.S. PATENT DOCUMENTS

| | | | |
|---|---|---|---|
| 4,988,131 A | 1/1991 | Wilson et al. | |
| 5,364,204 A | 11/1994 | MacLeod | |
| 5,630,304 A * | 5/1997 | Austin ........................... | 52/384 |
| 5,653,551 A | 8/1997 | Seaux | |
| 5,833,386 A | 11/1998 | Rosan et al. | |
| 5,992,106 A * | 11/1999 | Carling et al. .................. | 52/177 |
| 6,032,428 A | 3/2000 | Rosan et al. | |
| 6,098,354 A | 8/2000 | Skandis | |
| 6,282,858 B1 | 9/2001 | Swick | |
| 6,455,127 B1 | 9/2002 | Valtanen | |
| 6,511,257 B1 | 1/2003 | Seaux et al. | |
| 6,649,110 B1 | 11/2003 | Seaux et al. | |
| 6,662,508 B1 | 12/2003 | Else | |

(Continued)

*Primary Examiner* — Brian Glessner
*Assistant Examiner* — Brian D Mattei
(74) *Attorney, Agent, or Firm* — Barry I Friedman; Metz Lewis Brodman Must O'Keefe LLC

(57) ABSTRACT

A modular flooring system is disclosed which is designed to support heavy loads while providing stability and ground protection. The invention contemplates a modular tile with fully integrated connector loops, receiver pins and optional metal cam locks located in the corners of the floor tile or along the tile edges. The tiles contain an overlap edge, which engages with an underlay edge on an adjacent tile. This arrangement allows the tiles to overlap at an angle other than 90 degrees, providing greater strength at the point where adjacent tiles meet. The underlay edge contains a liquid capture channel which traps liquids which may seep between the adjacent tiles. The tiles are also provided with longitudinal recesses which extend through the top and bottom surfaces to the surface below, allowing for ventilation that is critical for grass and turf surfaces. The modular flooring system provides increased strength and stability and protection of the subsurface.

20 Claims, 9 Drawing Sheets

(56) References Cited

U.S. PATENT DOCUMENTS

| | | |
|---|---|---|
| 6,695,527 B2 | 2/2004 | Seaux et al. |
| 7,607,265 B2 | 10/2009 | Curry et al. |
| 7,621,092 B2 * | 11/2009 | Groeke et al. ............... 52/586.1 |
| 2003/0113162 A1 | 6/2003 | Seaux et al. |
| 2006/0070314 A1 * | 4/2006 | Jenkins et al. ................ 52/177 |
| 2006/0265975 A1 * | 11/2006 | Geffe .............................. 52/177 |
| 2007/0079569 A1 * | 4/2007 | Curry et al. .................. 52/309.8 |
| 2007/0113492 A1 * | 5/2007 | Dickey et al. ................. 52/177 |
| 2007/0261317 A1 | 11/2007 | Moller, Jr. |
| 2008/0127593 A1 * | 6/2008 | Janesky ......................... 52/581 |
| 2009/0308002 A1 | 12/2009 | Curry et al. |

* cited by examiner

MODULAR FLOORING SYSTEM

BACKGROUND OF THE INVENTION

1. Field of the Invention

The invention relates to a modular flooring system. More particularly, the invention relates to the use of modular floor tiles which provide increased strength, stability and protection of the subsurface.

2. Description of the Prior Art

Modular flooring of various designs has been utilized for a significant period of time to provide a temporary walking or other rigid surface in areas where permanent flooring is either not necessary or prohibitively expensive. More particularly, modular flooring is primarily utilized in commercial settings where a floor is temporarily needed, such as on an ice or a grass or artificial turf surface as well as in industrial or construction areas. With respect to industrial or construction areas, temporary flooring may be utilized to provide walkways, driveways, parking areas or other rigid surfaces for the transport of materials, vehicles, storage or mounting of equipment, or simply as a walking, seating or standing surface for people. The modular nature of such flooring is utilized to adapt the flooring to the particular topographic or geographic needs of the particular site and to also allow for the efficient storage and transport of the modular flooring. In addition, the use of relatively small modular floor tiles permits repairs and disposal of broken floor sections with relative ease.

In operation, the selection of the particular floor tile and its characteristics are primarily based upon the amount of load expected to be exerted on the modular flooring system, as well as the relative support characteristics of the underlying substrate be it concrete, artificial turf, grass, dirt, or the like. Once the particular floor tile is selected, a number of modular tiles typically having some type of interlock mechanism are applied to the surface and are generally laid in a sequential pattern, permitting the selective interlock of the various tiles and the placement of those tiles in a preplanned topographic design intended to permit the movement of materials, people, vehicles or the storage of the same in appropriate locations.

The modular floor tiles are themselves typically constructed of plastic or other polymeric materials which permit relatively high-strength sections having relatively low weight, providing ease of storage and portability. One particular shortcoming of plastic and polymeric materials is the coefficient of thermal expansion, which is relatively high in practice. Changes in temperature of the underlying substrate material, sunlight, as well as the ambient air proximate to the modular floor system cause relatively significant changes in dimensionality of the floor tiles. While the dimensional changes in each individual tile are relatively small, over a large area with hundreds, perhaps thousands, of interlocked tiles, the cumulative expansion or contraction of the entire flooring system causes significant problems with respect to maintenance of the floor, as well as the safety of the users. In practice, this expansion of the modular flooring system causes buckling, shifting and cracking of the floor tiles, as well as providing a tripping hazard for persons walking on the floor and potentially causing dangerous conditions which could cause vehicles to be diverted from their intended course over the surface of the modular floor.

In addition, the flooring system may cause damage to the surface on which it is assembled. For instance, even short term placement of the panels on grass or turf may harm the surface due to decreased exposure to sunlight and ventilation. Human or industrial use of the temporary flooring may also expose the underlying surface to various substances which may be harmful, for instance gas or oil that leaks from heavy equipment or food and beverages that are spilled on the top of the flooring.

Because the protective covering is often used on surfaces with multiple uses, installation and removal must be accomplished quickly. As a result, the current ground protective surfaces are constructed to comprise a number of units that are connected together to provide a large area covering of desired size. The connectors are generally constructed of the same plastic or other polymeric material as is utilized with the panels and are fully integrated into the panel itself. As a result, damage to one of the connectors necessitates that replacement of the entire panel, thus increasing the cost and time required for assembling the flooring system.

There remains a need, therefore, in the art of modular flooring, for a modular flooring system containing panels which maintain the alignment and appropriate location of sections for the entirety of the modular floor over its length. There is a need for floor panels with removable parts, particularly connectors, which may be easily and economically replaced. Additionally, there remains a need in the art for a modular flooring system which protects a surface from harmful substances while still providing adequate exposure to sunlight and proper ventilation.

SUMMARY OF THE INVENTION

A modular flooring system is disclosed which is designed to support heavy loads while providing stability and ground protection. The system contains an integrated connection system which is self-aligning and provides strength and durability. The system also provides increased protection of the covered ground surface.

In one embodiment, the invention contemplates a modular tile with increased strength and stability. The tile utilizes fully integrated connector loops and receiver pins located on adjacent edges. The loops and pins contain male and female edges which mate by snapping or sliding together. This system allows for self alignment of the flooring tiles. In addition, the tiles contain optional removable metal cam locks which are utilized for greater weight-baring loads. One or more metal cam locks may be located in the corners of the floor tile or along the underlay edge. The floor tiles utilize an optional base cover for additional support and ground protection. The base cover is preferably constructed from the same material as the tile. In an additional embodiment, the tiles may utilize feet with circular bases located on and extending from the bottom surface. The feet and circular base are constructed with rounded edges to prevent shearing or other damage to grass or turf surfaces.

The tiles of the present invention provide for increased protection of the covered subsurface. Specifically, the tiles contain an overlap edge, which engages with an underlay edge on an adjacent tile. This arrangement allows the tiles to overlap at an angle other than 90 degrees, providing greater strength at the point where adjacent tiles meet. The overlapping tiles help to prevent the leakage of unwanted liquids onto the ground below the tiles. In addition, the underlay edge contains a liquid capture channel which traps liquids which may seep between adjacent tiles. The tiles may be further provided with longitudinal recesses which extend through the top and bottom surfaces to the surface below. These recesses allow ventilation that is critical for grass and turf surfaces. The edges of the longitudinal recess are raised slightly above the upper surface of the tile, preventing liquids from leaking through the tile onto the surface below.

In an additional embodiment, the invention contemplates a modular floor covering system with increased strength and stability. The system utilizes a plurality of tiles with fully integrated connector loops and receiver pins located on adjacent edges. The loops and pins contain male and female edges which mate by snapping or sliding together. This system allows for self alignment of the flooring tiles. In addition, the tiles contain optional removable metal cam locks which are utilized for greater weight-baring loads. One or more metal cam locks may be located in the corners of the floor tile or along the underlay edge. The floor tiles may utilize an optional base cover for additional support and ground protection. The base cover is constructed from the same material as the tile. In an additional embodiment, the tiles utilize feet with circular bases located on and extending from the bottom surface. The feet and base are constructed with rounded edges to prevent shearing or other damage to grass or turf surfaces.

The system of the present invention utilizes a plurality of interconnected floor tiles which allow for increased protection of the covered subsurface. Specifically, the tiles contain an overlap edge, which engages with an underlay edge on an adjacent tile. This arrangement allows the tiles to overlap at an angle other than 90 degrees, providing greater strength at the point where adjacent tiles meet. The overlapping tiles help to prevent the leakage of unwanted liquids onto the ground below the tiles. In addition, the underlay edge contains a liquid capture channel, which traps liquids which may seep between the adjacent tiles. The tiles are provided with longitudinal recesses which extend through the top and bottom surfaces to the surface below. These recesses allow ventilation that is critical for grass and turf surfaces. The edges of the longitudinal recess are raised slightly above the upper surface of the tile, preventing liquids from leaking through the tile onto the surface below.

DESCRIPTION OF THE PREFERRED EMBODIMENTS

Figure 1:
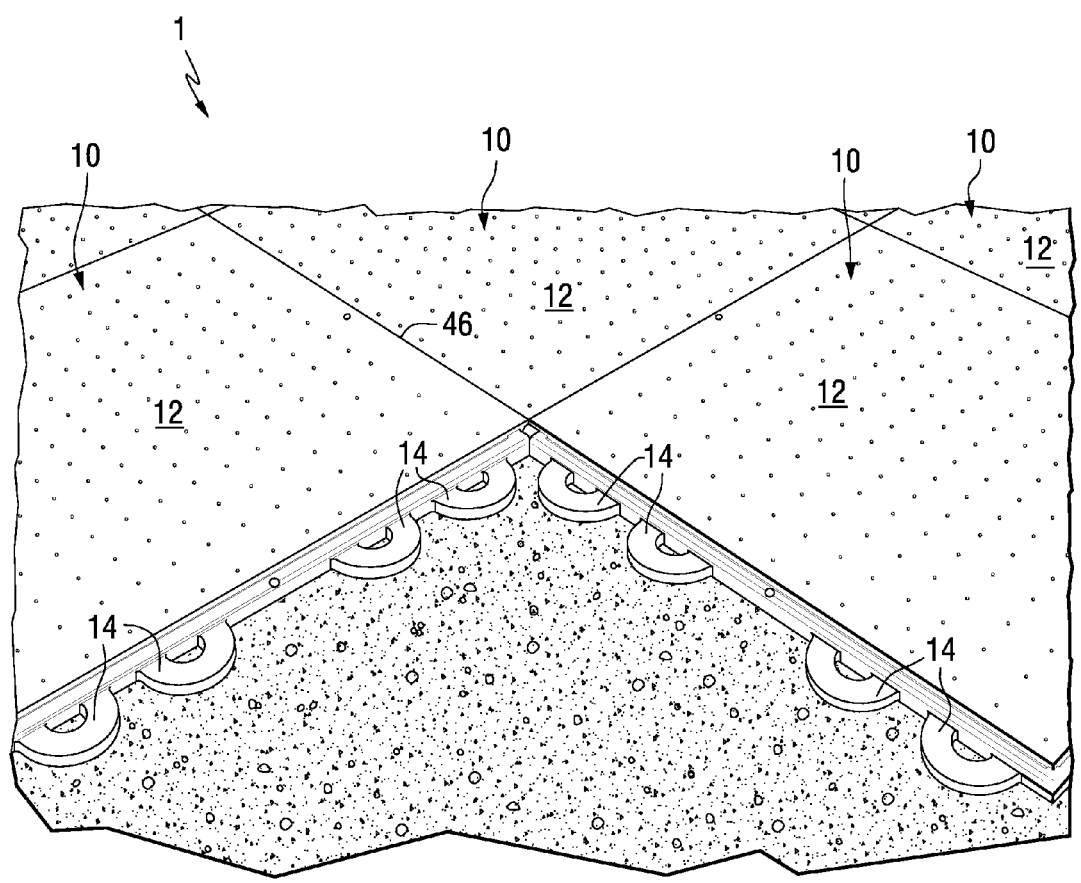
FIG. 1 is a top plan view of the modular flooring system in accordance with the present invention.
Figure 2A:
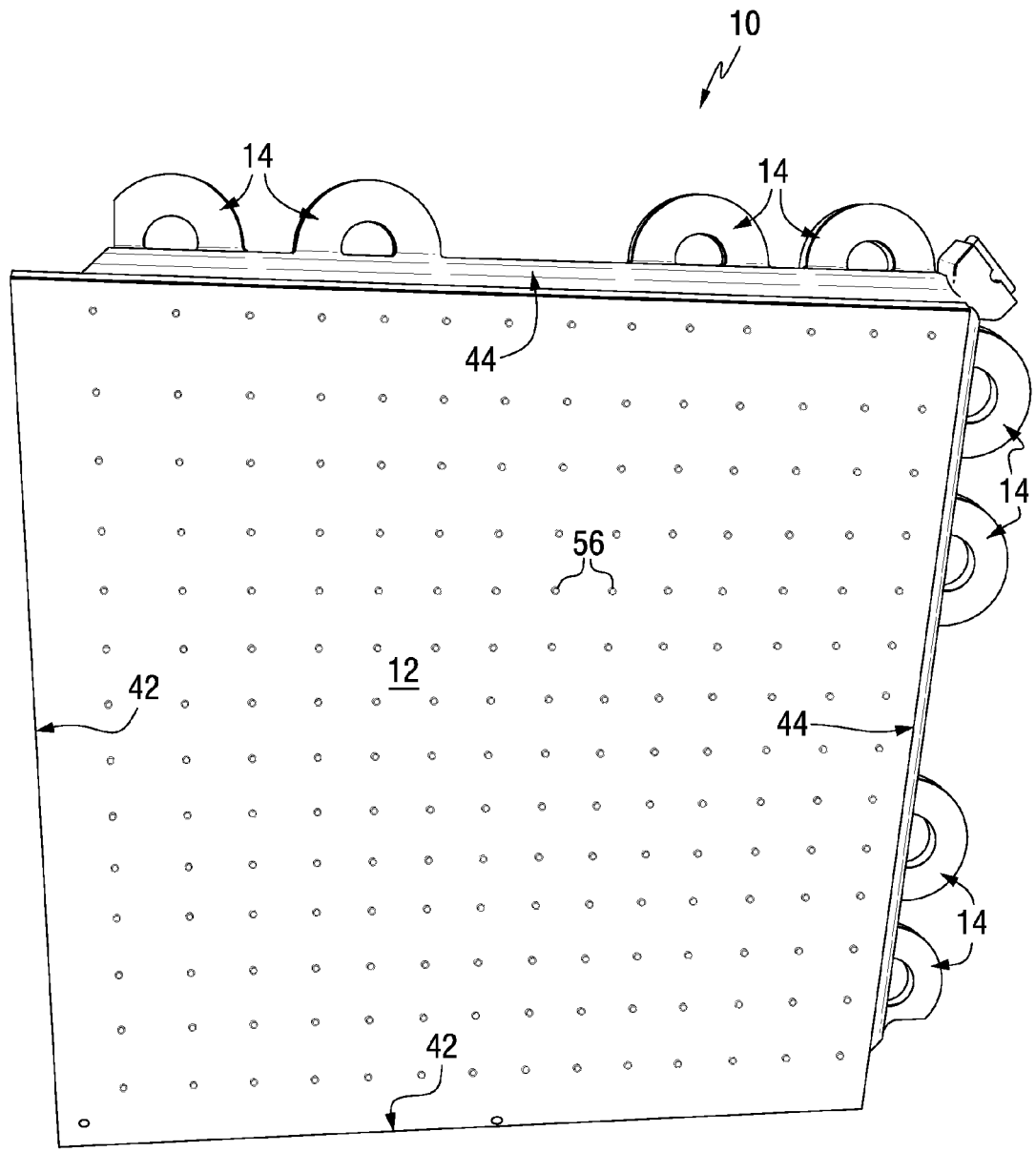
FIG. 2A is a top view of a modular floor tile in accordance with the present invention.
Figure 2B:
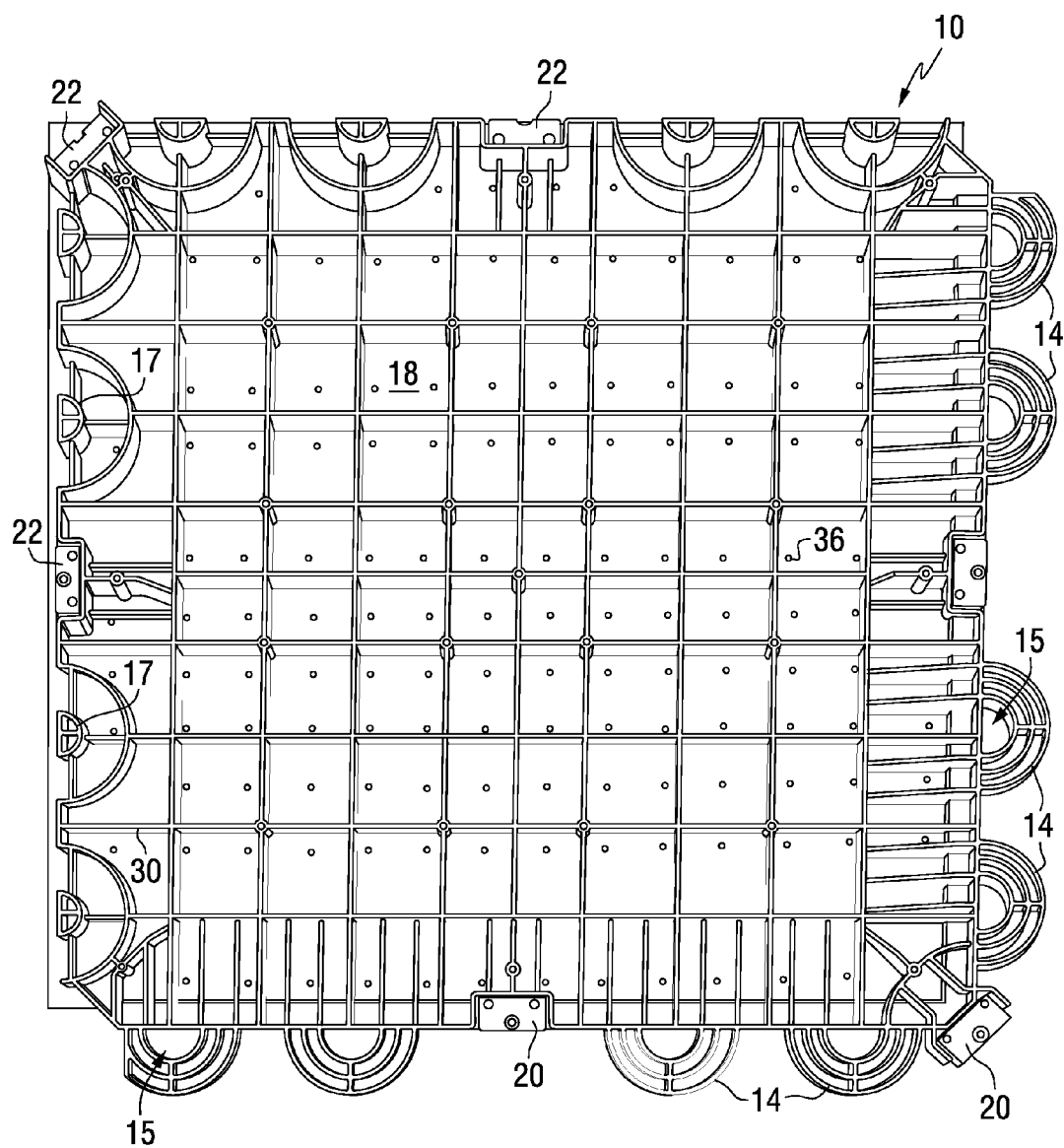
FIG. 2B is a view of a modular floor tile as seen from the bottom in accordance with the present invention.
Figure 2C:
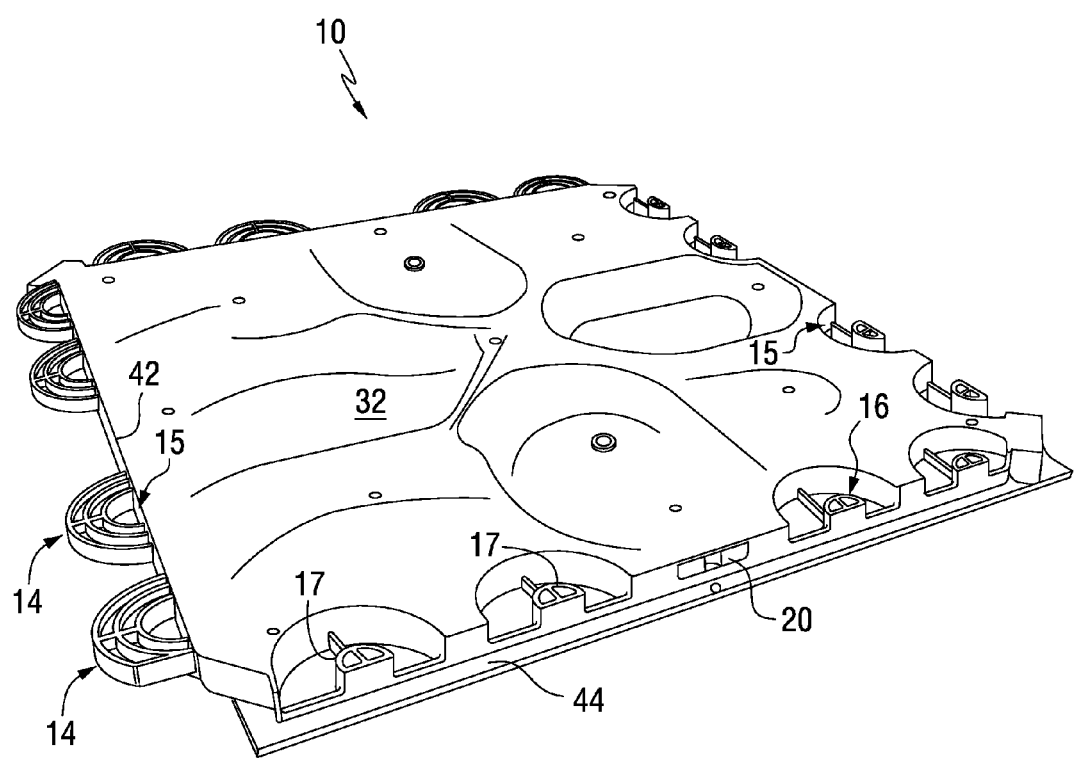
FIG. 2C is a view of a modular floor tile incorporating a base cover as seen from the bottom in accordance with the present invention

Referring to FIG. 1, a matrix of modular floor tiles 1 is illustrated having a number of component parts. Modular floor tiles 10 are provided in an interlocking matrix 1 which extends in two dimensions in accordance with a preset topographic plan. The topographic plan is typically directed towards the conveyance or support of equipment, vehicles, personnel and the like and is adapted to conform to the topographic or geographic features of the substrate surface, such as grass, dirt, artificial turf or the like. Each of the modular floor tiles 10, with the exception of the interchangeable aluminum cam locks and base cover as hereinafter described in greater detail, is preferably formed as a one-piece unit (FIGS. 2A, 2B and 2C). Each of the modular floor tiles 10 comprises a top surface 12 and a bottom surface 18. Each of the modular floor tiles 10 is generally of square configuration. However, any suitable shape, including rectangular or hexagonal, is suitable provided that the sides and ends of the tiles are adapted for contiguous alignment with adjacent tiles. Each modular floor tile 10 provides, for example a usable surface of 42"×42" and is, for example, 2" in thickness. Generally, a number of modular floor tiles 10 would be used, for example, 50, 75, 100 or more tiles. Such tiles are essentially of the same size and shape to prove for contiguous coverage of the surface.

With respect to the use of the modular floor tiles 10 of the present invention, the sides and ends of the tiles, when installed as a modular flooring system, are essentially in continuous contact with each other. Therefore, there are no significant gaps between the modular floor tiles 10 to provide essentially complete coverage of the subsurface.

Modular floor tiles 10 are typically constructed of plastic material and are preferably polypropylene, polyethylene, polystyrene, acrylonitrile butadiene styrene, and polyvinylchloride. In a preferred embodiment, the modular floor tiles 10 are constructed of high-density polyethylene (HDPE) post-industrial recycled plastic, reinforced with adhesives for added strength, flex and impact characteristics. However, it should be understood that the modular floor tiles 10 may be constructed of any suitable material having the strength and durability requirements necessary for their intended purpose. The plastics may be translucent, so that at least a minimal amount of sunlight may pass through the modular floor tile 10 and enable photosynthesis to continue while the grass surface is covered. The top surface 12 is generally a flat configuration, but may contain some texture to provide traction to the smooth surface.

Differences between the illustrated embodiments, as well as other embodiments not illustrated herein, but within the scope of knowledge of one skilled in the art, would include changes in dimensionality, including height, width and length, as well as surface features. One significant feature of modular floor tile 10 when assembled into a matrix 1 is the desire to reduce any misalignment or unintentional three-dimensional surface changes in the top surface 12 of the floor tiles. Any height misalignment or departure of the floor tile from uniform engagement with the substrate may result in an unsafe condition presented by improper interlocking of modular floor tiles 10 or buckling of the entirety or portions of the matrix 1 surface causing an uneven walking or vehicular traffic surface.

Referring to FIGS. 2A-2C, a modular floor tile 10 is illustrated having a number of component parts. FIG. 2A illustrates top surface 12 of modular floor tile 10. The design of top surface 12 is specifically intended to provide a relatively flat surface within the tolerances necessary to reduce any hazard of tripping or other negative consequences of an uneven floor surface. Unlike many prior art floor covering systems, top surface 12 contains no surface channels into which dirt or debris may become trapped.

To enable interlocking tiles across the area of the ground surface, modular floor tiles 10 are typically provided with a series of connector loops 14, which are spaced along each of two adjacent edges and extend outwardly from the perimeter of each tile 10. In accordance with the specific design features of each embodiment, the connector loops 14 may be of any size or shape appropriate to support the weight and load requirements of the tile. Furthermore, the number of distribution of the connector loops 14 are determined by the physical conditions of the likely substrate, as well as the particular load requirements. FIGS. 2B and 2C illustrate bottom surface 18 of modular floor tile 10. In the embodiments illustrated in FIGS. 2B and 2C, four connector loops are placed on adjacent sides of the modular floor tile 10. Receiver pins 16 are also located on the perimeter of each of the modular floor tiles 10 for receiving and restraining connector loops 14 and are disposed geometrically in accordance with the corresponding location of connector loops 14 on adjacent floor tiles 10. It will thus be appreciated that the sequential application of modular floor tiles 10 will include the serial interlocking of adjacent floor tiles in a matter to extend matrix 1 in two dimensions. Modular floor tiles 10 are designed for easy connection in allowing the tiles to nest into each other. Reinforced ribbing (not shown) is placed behind connector loops 14 and adds additional strength to modular floor tiles 10.

Figure 5:
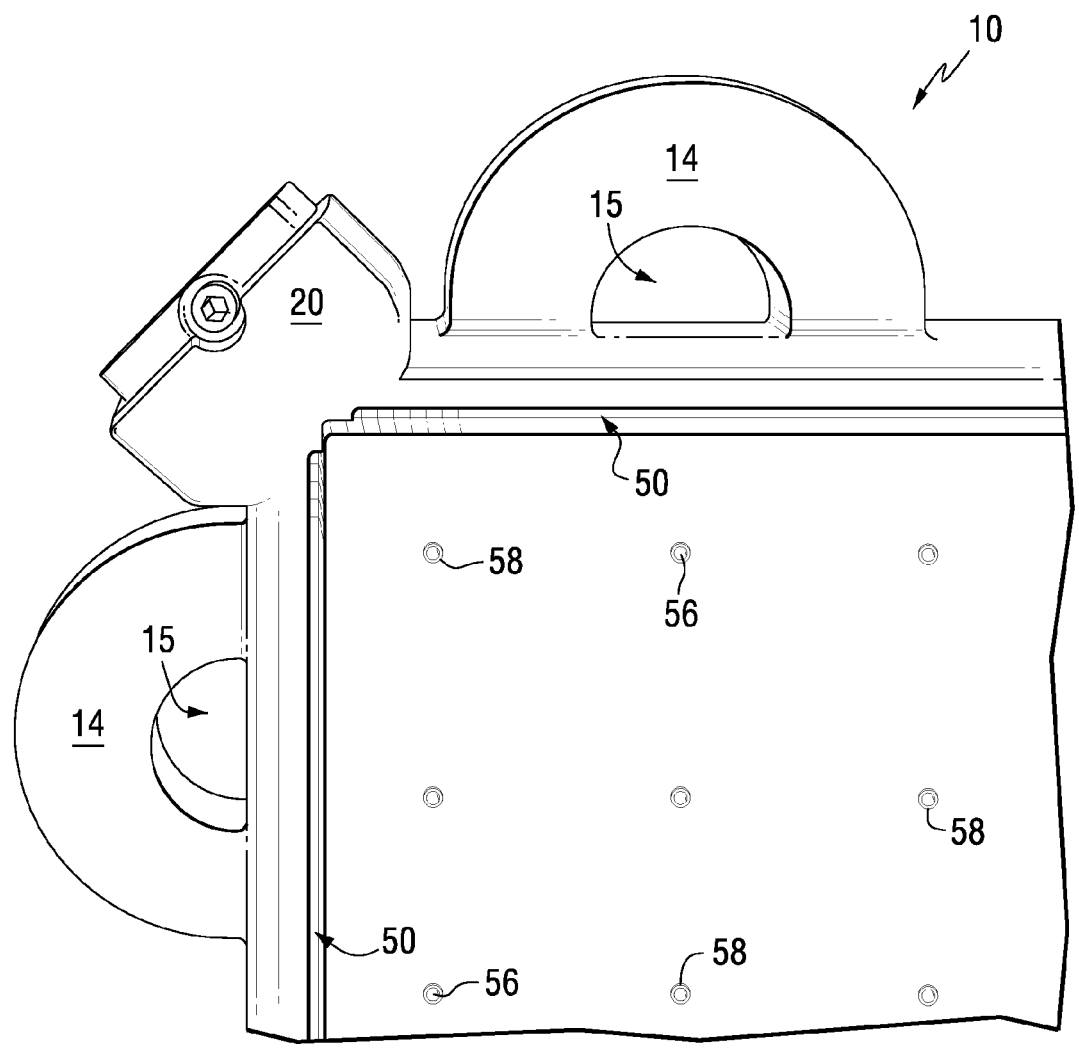
FIG. 5 is a top view of one corner of a modular floor tile in accordance with the present invention.

Large panel structures, such as those constructed for use in stadiums or arenas, are subjected to high amounts of lateral and torsional stress. To overcome this problem, connector loops 14 and receiver pins 16 are fully integrated into modular floor tile 10, i.e., they are constructed from the same strong HDPE material and are not removable components. In one embodiment as illustrated in FIGS. 2B, 2C and 5, connector loop 14 is provided in a semicircle configuration with a recessed center female portion 15. Receiver pin 16 is provided as a recessed semicircle with a raised male center portion 17. The raised male portion 17 of the receiver pin 16 is adapted to mate with the recessed center female portion 15 of the connector loop 14. Adjacent tiles 10 are connected by placing panels 10 into the desired position and nesting or snapping male portion 17 of the receiver pin 16 into the recessed center female portion 15 of the connector loop 14. The connector loop 14 fits snugly into the receiver pin 16 and it not readily removable, thus ensuring a conforming fit of adjacent tiles within the assembled floor. The placement of multiple connector loops 14 and receiver pins 16 on adjacent sides of modular floor tile 10 and the interlocking of these components is designed to force the alignment of adjacent modular tiles 10. This self-aligning capability restricts movement of modular floor tiles 10 after assembly and provides lateral and torsional support. Placement of the snug-fitting connector loop 14 into the receiver pin 16 keeps the resulting flooring system in alignment at all times regardless of the type of use, the amount of traffic or the amount of load under which it is placed.

Referring again to FIGS. 2B and 2C, optional rotating cam locks 20 are shown located in one corner of modular floor tile 10. Utilization of one or more cam locks 20 provides additional strength and prevents movement of modular floor tiles 10 when subjected to heavy loads or fluctuation in temperature. A key or tool is used to rotate the cam. Cam 20 is an offset cam which is reversible, thus allowing for the construction and disassembly of the modular flooring system. In an alternative embodiment, one or more cam locks 20 are placed along the underlay edge 44 of modular tile 10, which is described in greater detail below. Cam lock base 22 is also located on a corner or an underlay side of the modular floor tiles 10 for receiving and locking with cam lock 20 and is disposed geometrically in accordance with the corresponding location cam lock 20 on adjacent floor tiles 10. It will thus be appreciated that the sequential application of modular floor tiles 10 will include the serial locking of adjacent floor tiles in a matter to extend matrix 1 in two dimensions. Prior art cam locks are generally constructed of plastic materials, for instance the same plastic used in the construction of the floor tile 10. In contrast, cam lock 20 is constructed from a high grade metal, for example aluminum, which provides increased torsional strength and stability for heavy load applications. Metal cam locks are more resistant to damage that their plastic counterparts. Cam locks 20 are self contained units which may be removed from modular floor tile 10 if such additional support is unnecessary, i.e., for lighter load applications. Cam locks 20 may be removed from modular floor tile 10 if they become damaged. This prevents the need to replace the complete modular floor tile 10 if cam locks 20 become unusable, thus reducing the costs associated with the present modular flooring system. Optionally, additional cam locks 20 and cam bases 22 may be located along the perimeter of modular floor tile 10 if additional support is necessary, as illustrated in FIGS. 2B and 2C. The placement and connection of these additional cam locks 20 and bases 22 will be similar to that of the connector loops 14 and receiver pins 16 as described above.

Figure 3:
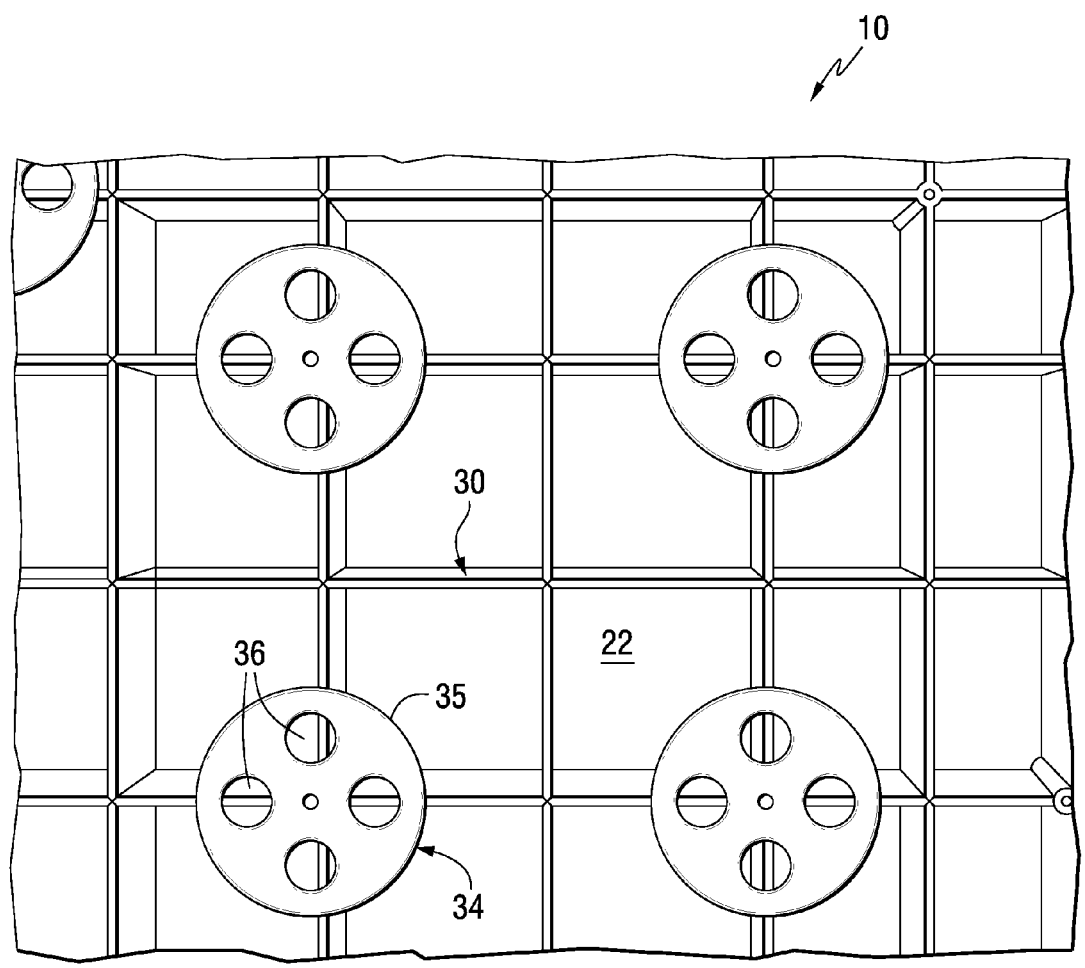
FIG. 3 is a view of a modular floor tile incorporating a base cover and feet as seen from the bottom in accordance with the present invention.

Referring now to FIG. 2B, the underside or bottom surface 18 of each modular floor tile 10 is formed with a supporting framework of bi-directional ribs 30. Ribs 30 extend across the entire length and width of bottom surface 18. Such placement allows for equal weight distribution and minimizes surface area contact with the ground or floor beneath modular floor tile 10. Ribs 30 are constructed with radius or rounded ends (not shown) which eliminates any sharp edges. Smooth and rounded edges will not cut natural grass or turf. If the ribs 30 come into contact with the grass or turf surface when assembled, the ribs 30 will not shear or otherwise damage the grass. Referring now to FIG. 2C, bottom surface 18 of modular floor tile 10 is shown with base cover 32. Bottom surface 18 is adapted to receive cover 32, which is attached by snapping or locking into place. The design of base cover 32 is intended to provide a relatively flat surface while allowing for additional strength, rigidity and weight distribution for heavier loads. In one embodiment, base cover is constructed from the same materials as the remainder of the modular floor tile 10. Referring now to FIG. 3, base 22 of modular floor tile 10 is shown with feet 34. Feet 34 provide additional height and clearance while minimizing the impact on the ground surface. Feet 34 are further provided with a circular base 35 containing smooth rounded edges (not shown) to prevent damage to grass or turf. While feet 34 and circular base 35 maintain the modular floor tile in position, the grass or turf surface is not damaged. Circular openings 36 are provided on circular base 35, providing ventilation to any grass growing on the lower surface. Although feet 34 are shown in a circular configuration, it is to be understood that they may be constructed in any size or shape that will allow for proper support while minimizing damage to the surface.

Figure 4:
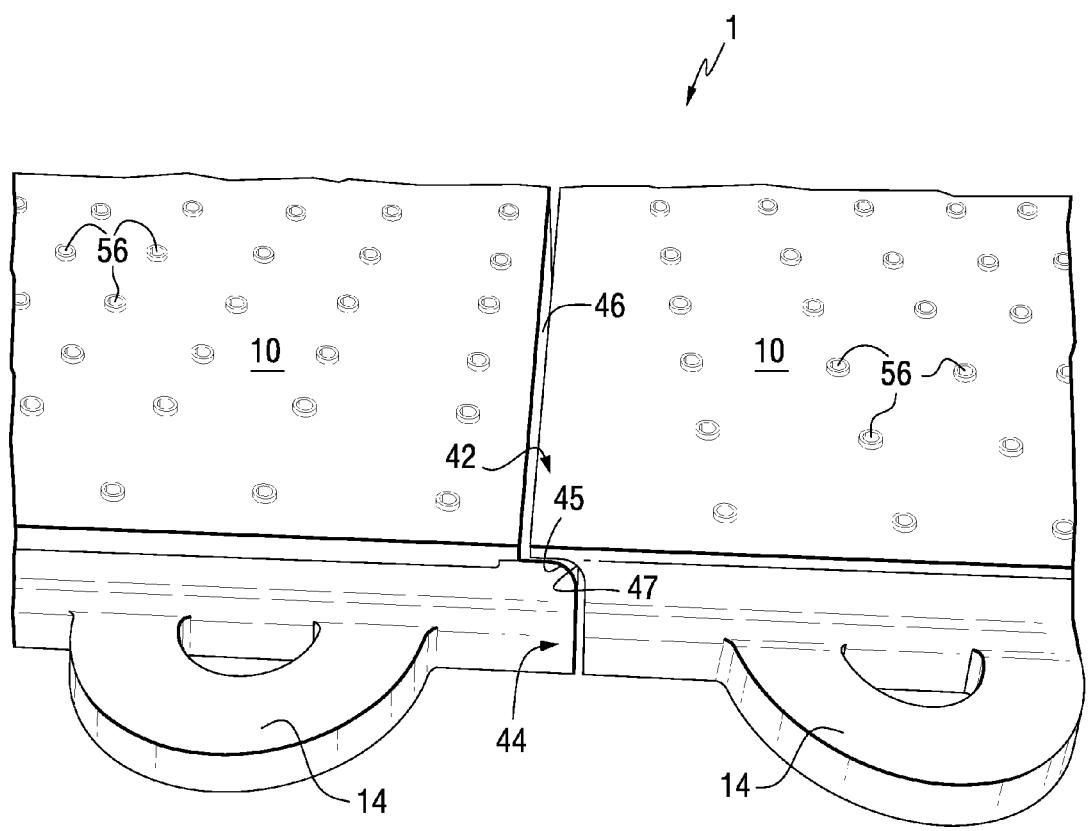
FIG. 4 is a view of the overlap/underlay position of two adjacent modular floor tiles in accordance with the present invention.

Referring now to FIG. 4, modular floor tiles 10 overlap at overlap/underlay position 40. Modular floor tile 10 has an overlap edge 42 which extends over the underlay edge 44 of the adjacent modular floor tile 10. Underlay edge 44 contains a rounded portion 45 while overlap edge 42 contains a concave portion 47. Rounded portion 45 of underlay edge 44 fits beneath and operatively engages the concave portion 47 overlap edge 42 of an adjacent tile in a direction that deviates substantially from the vertical direction. Specifically, the configuration and position of the overlap edge 42 and underlay edge 44 of adjacent tiles prevents adjacent modular floor tiles from overlapping at a ninety-degree angle. A substantially vertical or ninety-degree angle at the point of overlap causes shear stress and weakens the connection between the adjacent modular floor tiles 10, which may result in cracking or breaking of the modular floor tiles 10. This overlap edge 42/underlay portion edge configuration reduces this shear stress and strengthens the overlap edge 42/underlay edge 44 connection between tiles 10. The configuration and position of the overlap edge 42 and underlay edge 44 provides continuous coverage of the subsurface and prevents unwanted liquids from reaching the surface.

Referring now to FIGS. 2A and 4-6, underlay edge 44 is provided with a liquid capture channel 50 along the length of the side of the underlay edge 44. The liquid capture channel 50 collects fluids which are dropped or spilled on the surface of the modular floor tile 10. The fluids are therefore prevented from flowing through the seam 46 between adjacent modular floor tiles 10 and onto the protected surface. Many prior art tiles contain on their surface a plurality of longitudinal and transverse recesses configured in a grid-like pattern. While these recesses may function to receive and contain liquids, such recesses also collect dirt and debris which may be a hazard to those using the surface. The present modular floor tiles 10 avoid the use of any surface channels which may collect debris. The location of liquid capture channel 50 along underlay edge 44 traps liquids and dirt away from any foot traffic, thus providing a cleaner and safer walking surface.

Figure 6:
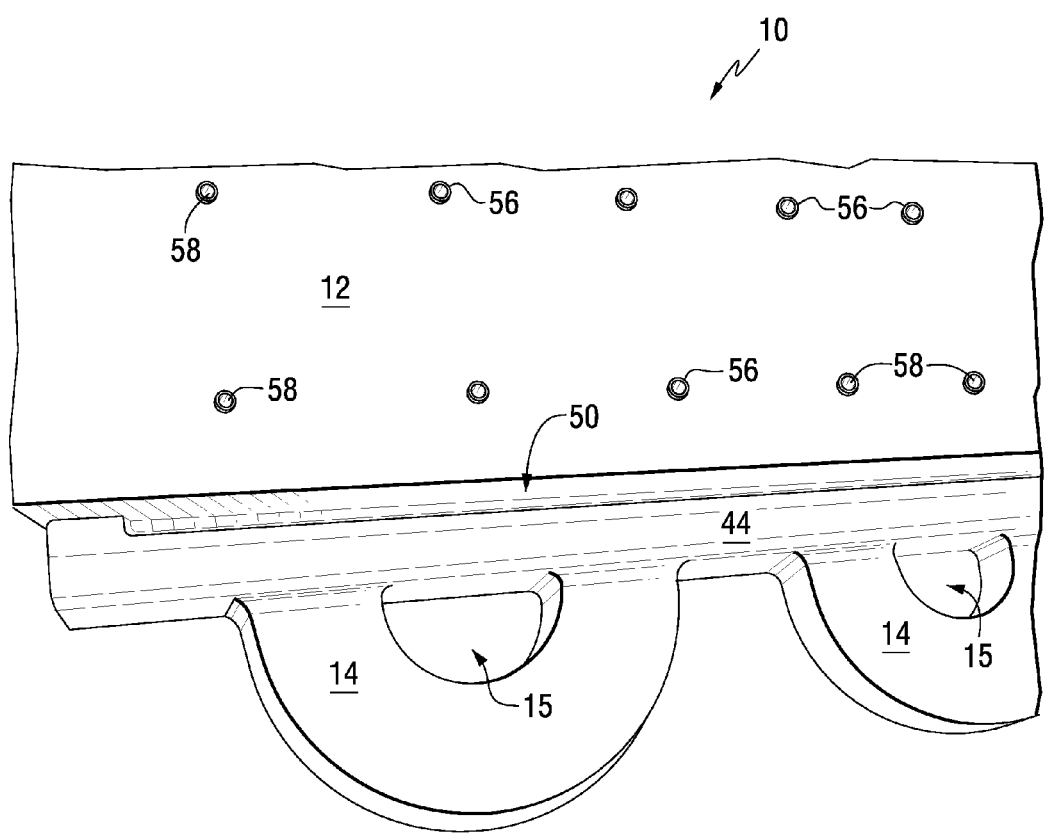
FIG. 6 is a top view of the underlay portion of a modular floor tile in accordance with the present invention.

Referring now to FIGS. 5 and 6, modular floor tile 10 has on its top surface 12 a plurality of longitudinal recesses 56 which extend downward through bottom surface 18. The recesses are of such a width, for instance 1.5 mm, as to insure that footwear will not become stuck and cause injury to the wearer. The recesses 56 function as aeration holes to allow exposure of light and air to the grass or turf subsurface. The upper portion of each recess 56 is surrounded by a raised ridge 58 which extends slightly above the top surface 12 of the floor tile 10. The raised edge 58 prevents casual spills from flowing through the top surface 12 and bottom surface 18 to the ground below. Raised ridge 58 provides additional traction during wet conditions, but will not trap dirt or other debris on top surface 12.

Figure 7:
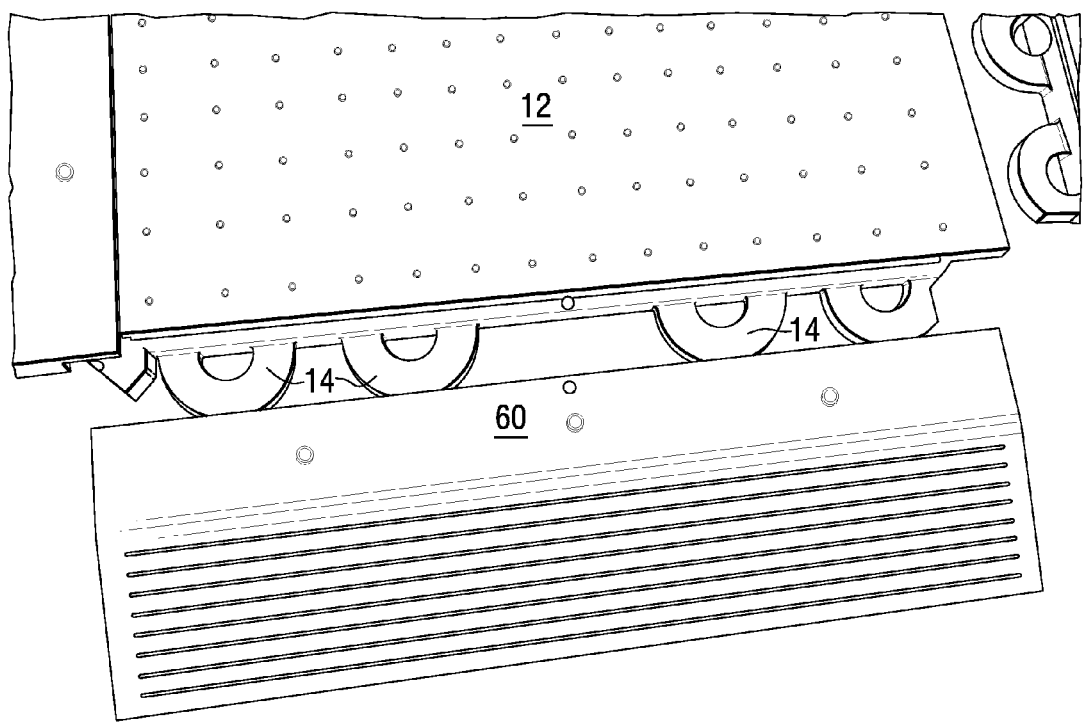
FIG. 7 is a top view of a modular floor tile with a sloped side edge in accordance with the present invention.

Referring now to FIG. 7, one or more of the modular floor tiles 10 may be provided with one or more sloped side edges 60 to permit wheeled vehicles, such as wheel chairs or construction vehicles, to gain access to the modular flooring system. Sloped side edge 60 contains one or more receiver pins 16 and raised male center portion 17 (not shown) which mate with the recessed center female portion 15 (not shown) of the connector loop 14 of the adjacent tile 10. The connector loop 14 fits snugly into the receiver pin 16 and it not readily removable, thus ensuring a conforming fit of the sloped side edge with the adjacent tile 10.

Finally, one preferred embodiment of the invention has been described hereinabove and those of ordinary skill in the art will recognize that this embodiment may be modified and altered without departing from the central spirit and scope of the invention. Thus, the embodiment described hereinabove is to be considered in all respects as illustrative and not restrictive. The scope of the invention being indicated by the appended claims rather than the foregoing descriptions and all changes which come within the meaning and range of equivalency of the claims are intended to be embraced herein.

What is claimed is:

1. A modular tile for forming a floor covering, comprising:
   a top surface forming a main body of said tile;
   a bottom surface comprising a plurality of bi-directional ribs;
   at least one overlap edge section extending outwardly from at least a portion of said main body comprising a radiused overlap edge; and
   at least one underlay edge section extending outwardly from at least a portion of said main body comprising a radiused underlay edge, said underlay edge section comprising a liquid capture channel located outside of said main body;
   wherein said overlap edge section extends over and operatively engages an underlay edge section of an adjacent tile in an interlocking orientation.

2. The modular floor tile of claim 1, further comprising at least one fully integrated connector loop and at least one fully integrated loop receiver.

3. The modular tile of claim 1 further comprising at least one longitudinal recess with a raised edge.

4. The modular tile of claim 1 further comprising at least one removable cam lock and at least one cam base.

5. The modular tile of claim 4 wherein said at least one removable cam lock comprises a metal cam lock.

6. The modular tile of claim 5 wherein said at least one removable metal cam lock comprises an aluminum cam lock.

7. The modular tile of claim 4 wherein said at least one removable cam lock and at least one cam base are located on adjacent corners of said modular floor tile.

8. The modular tile of claim 4 wherein said at least one removable cam lock and at least one cam base are located along said underlay edge of said modular floor tile.

9. The modular tile of claim 1, wherein said bottom surface further comprises a bottom cover.

10. The modular floor tile of claim 1 further comprising one or more sloped side edges.

11. A modular floor covering system comprising a plurality of interconnected tiles wherein each of the tiles comprises:
    a top surface forming a main body of said tile;
    a bottom surface comprising a plurality of bi-directional ribs;
    at least one overlap edge section extending outwardly from at least a portion of said main body comprising a radiused overlap edge; and
    at least one underlay edge section extending outwardly from at least a portion of said main body comprising a radiused underlay edge, said underlay edge section comprising a liquid capture channel located outside of said main body;
    wherein said overlap edge extends over and operatively engages an underlay edge of an adjacent tile in an interlocking orientation and said liquid capture channel is disposed to collect liquids penetrating a space between said tiles.

12. The modular floor covering system of claim 11 wherein said tiles further comprise at least one fully integrated connector loop and at least one fully integrated loop receiver.

13. The modular floor covering system of claim 11 wherein said tiles further comprise at least one longitudinal recess with a raised edge.

14. The modular floor covering system of claim 11 wherein said tiles further comprise at least one removable cam lock and at least one cam base.

15. The modular floor covering system of claim 14 wherein said at least one removable cam lock comprises a metal cam lock.

16. The modular floor covering system of claim 15 wherein said at least one removable metal cam lock comprises an aluminum cam lock.

17. The modular floor covering system of claim 14 wherein said at least one removable cam lock and at least one cam base are located on adjacent corners of said modular floor tile.

18. The modular floor covering system of claim 14 wherein said at least one removable cam lock and at least one cam base are located along said underlay edge of said modular floor tile.

19. The modular tile of claim 11 wherein said bottom surface further comprises a bottom cover.

20. The modular floor tile of claim 11 further comprising one or more sloped side edges.

* * * * *